(12) United States Patent
Anderson et al.

(10) Patent No.: US 10,027,216 B2
(45) Date of Patent: Jul. 17, 2018

(54) HYBRID MACHINE FOR SUSTAINABLE ENERGY

(71) Applicant: No Fossil Energy, LLC, Odenton, MD (US)

(72) Inventors: Bruce Elliot Anderson, Odenton, MD (US); Robert E Craft, III, Millersville, MD (US); Stephen Mullinix, Millersville, MD (US)

(73) Assignee: No Fossil Energy, LLC, Odenton, MD (US)

( * ) Notice: Subject to any disclaimer, the term of this patent is extended or adjusted under 35 U.S.C. 154(b) by 90 days.

(21) Appl. No.: 14/262,492

(22) Filed: Apr. 25, 2014

(65) Prior Publication Data

US 2014/0319947 A1    Oct. 30, 2014

Related U.S. Application Data

(60) Provisional application No. 61/816,240, filed on Apr. 26, 2013.

(51) Int. Cl.
| | |
|---|---|
| *H02K 7/20* | (2006.01) |
| *H02K 53/00* | (2006.01) |
| *H02J 9/06* | (2006.01) |

(52) U.S. Cl.
CPC ............. *H02K 53/00* (2013.01); *H02J 9/06* (2013.01); *H02K 7/20* (2013.01)

(58) Field of Classification Search
CPC .............. H02K 7/02; H02K 7/20; H02J 9/066
USPC .......................................................... 310/74
See application file for complete search history.

(56) References Cited

U.S. PATENT DOCUMENTS

| | | | | |
|---|---|---|---|---|
| 3,609,426 | A * | 9/1971 | Gaul ...................... | H02J 9/066 290/4 C |
| 6,573,626 | B1 | 6/2003 | Gosebruch et al. | |
| 6,962,050 | B2 | 11/2005 | Hiraki et al. | |
| 6,984,305 | B2 | 1/2006 | McAlister | |
| 7,143,597 | B2 | 12/2006 | Hyland et al. | |
| 7,845,298 | B2 * | 12/2010 | Rayner .................... | B63G 8/30 114/238 |
| 7,994,649 | B2 | 8/2011 | Abatemarco | |
| 8,323,144 | B1 * | 12/2012 | Bin ........................ | B60K 6/105 180/65.21 |

(Continued)

OTHER PUBLICATIONS

University Physics, Sears et al, sixth Edition, p. 349-350.*

*Primary Examiner* — Joshua Benitez Rosario
*Assistant Examiner* — Leda Pham
(74) *Attorney, Agent, or Firm* — Kenneth P. Waszkiewicz

(57) ABSTRACT

The present invention discloses an apparatus that includes a motor, flywheel, transmission, and generator. The motor converts an input energy into mechanical energy to rotate an output shaft coupled to a shaft of a flywheel. The design characteristics of the flywheel provide substantially uniform rotational speed to its shaft when the flywheel rotates. The rotating shaft of the flywheel connects to an input shaft of a transmission that includes a gear train that transfers the rotational speed of the flywheel to an output shaft of the transmission. The output shaft of the transmission drives an input shaft of a generator that converts the rotational speed to an output energy. After an initial start period, the output energy is sufficient to sustain mechanical operation of the apparatus, and provide power to external devices.

8 Claims, 2 Drawing Sheets

(56) References Cited

U.S. PATENT DOCUMENTS

| | | | |
|---|---|---|---|
| 2003/0080711 A1* | 5/2003 | Stearns | H02J 7/1415 320/101 |
| 2009/0267347 A1 | 10/2009 | Abatemarco | |
| 2011/0001400 A1* | 1/2011 | Chiba | B60K 6/40 310/67 R |
| 2012/0193187 A1* | 8/2012 | Osawa | B60K 6/40 192/85.17 |
| 2013/0150207 A1* | 6/2013 | Kobayashi | B60K 6/442 477/5 |

* cited by examiner

HYBRID MACHINE FOR SUSTAINABLE ENERGY

CROSS-REFERENCE TO A RELATED APPLICATION

This application for letters patent relates to and claims the benefit of U.S. Provisional Patent Application Ser. No. 61/816,240, titled HYBRID MACHINE FOR SUSTAINABLE ENERGY, and filed on Apr. 26, 2013, the disclosure of which this application hereby incorporates by reference.

BACKGROUND OF THE INVENTION

A machine includes a power source and a power transmission system. The power transmission system controls the application of the power generated by the power source. Conventional power transmission systems include a gearbox and a propeller shaft that transmits the energy from the power source to an axle. The gearbox typically includes gears, or gear trains, to provide speed and torque conversions from the power source to the axle.

A hybrid machine includes a power transmission system that receives power from two or more sources. The design of the hybrid machine combines the best characteristics of each power source. In the motor vehicle industry, conventional hybrid vehicles combine the best characteristics of an electric motor and an internal combustion engine to produce a more efficient motor vehicle.

Sustainable energy is the ability to produce energy to meet the present energy need without compromising the ability to meet that energy need in the future. Technology that promotes sustainable energy focuses on renewable energy sources and energy efficiency.

SUMMARY OF THE INVENTION

The present invention discloses an apparatus that includes a motor, flywheel, transmission, and generator. The motor converts an input energy into mechanical energy to rotate an output shaft coupled to a shaft of a flywheel. The design characteristics of the flywheel provide substantially uniform rotational speed to its shaft when the flywheel rotates. The rotating shaft of the flywheel connects to an input shaft of a transmission that includes a gear train that transfers the rotational speed of the flywheel to an output shaft of the transmission. The output shaft of the transmission drives an input shaft of a generator that converts the rotational speed to an output energy. After an initial start period, the output energy is sufficient to sustain mechanical operation of the apparatus, and provide power to external devices.

DETAILED DESCRIPTION OF THE INVENTION

Conventional hybrid machines include a combustion engine as one of the power sources. The combustion engine typically utilizes a fuel such as fossil fuel, combustible gas (e.g., hydrogen or propane), alcohol, or the like. There is a need for a hybrid machine that produces sustainable energy without reliance on a combustion engine.

Figure 1:
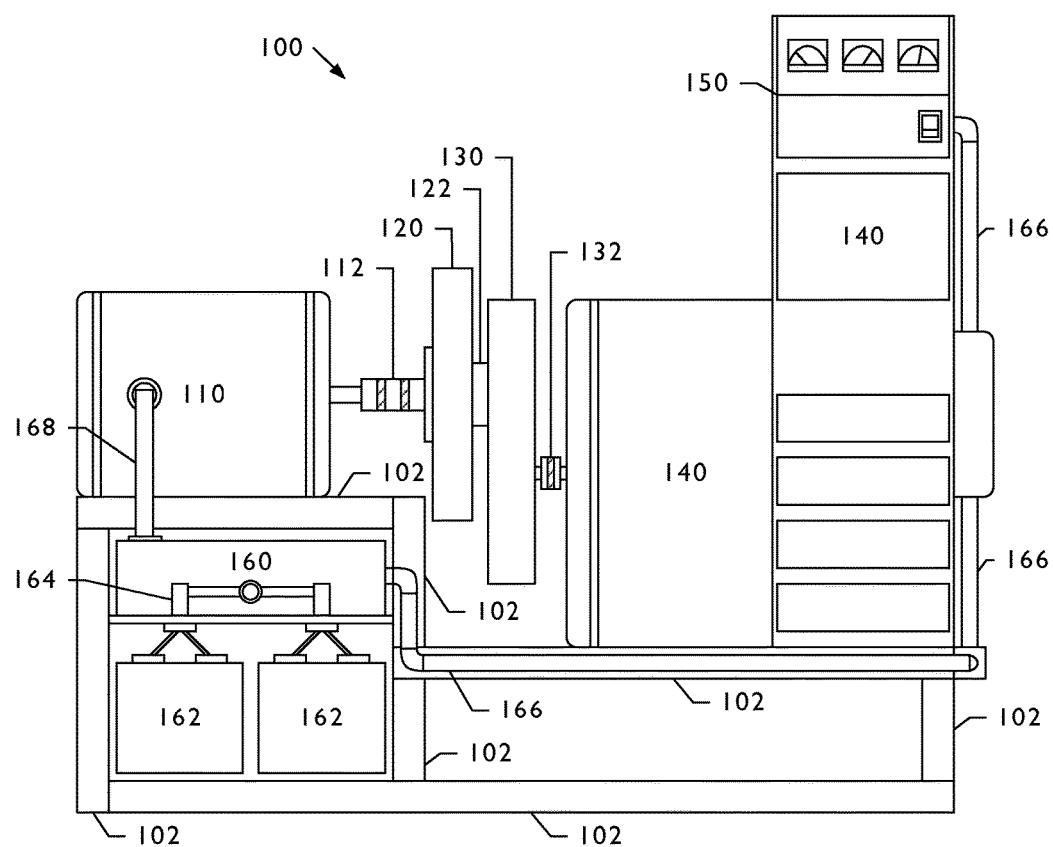
FIG. 1 is a perspective diagram that illustrates one embodiment of a hybrid machine for sustainable energy.

FIG. 1 is a perspective diagram that illustrates one embodiment of a hybrid machine that produces sustainable energy. The hybrid machine 100 shown in FIG. 1 includes a unit frame 102 that encloses a motor 110, flywheel 120, transmission 130, generator 140, charging unit 160, and battery pack 162.

The motor 110 is a power source for the hybrid machine 100 that converts an input energy into mechanical energy to rotate a shaft. In one embodiment, the motor 110 is an electric motor that converts electrical energy into mechanical energy to rotate the shaft. In various other embodiments, the motor 110 is a solar-powered motor, hydroelectric motor, wind-powered motor, or the like.

The flywheel 120 for the hybrid machine 100 is a disk or wheel having design characteristics that result in a momentum when the flywheel 120 is rotating on its shaft that provides substantially uniform rotational speed to the shaft. The shaft of the motor 110 connects to the shaft of the flywheel 120 via a coupling 112.

The transmission 130 for the hybrid machine 100 transfers the energy input from the flywheel 120 to an output shaft using a system of shafts, gears, torque converters, gear trains, and the like. The flywheel 120 connects to the transmission 130 via a transfer shaft 122.

The generator 140 for the hybrid machine 100 converts the mechanical energy output by the transmission 130 into electricity. The output shaft of the transmission 130 connects to an input shaft of the generator 140 via a coupling 132.

A control unit 150 for the hybrid machine 100 monitors the frequency, amperage, and voltage of the electricity that the generator 140 produces. The control unit 150 connects to the generator 140 via conduit (not shown), and to the charging unit 160 and battery pack 162 via conduit 166.

The charging unit 160 for the hybrid machine 100 is a converter and inverter circuit that transfers the electricity it receives from the control unit 150 and generator 140. The charging unit 160 connects to the control unit 150 via conduit 166, the battery pack 162 via conduit 164, and the motor 110 via conduit 168.

The battery pack 162 for the hybrid machine 100 stores electrical energy that it receives from the charging unit 160.

In one embodiment, the motor 110 for the hybrid machine 100 shown in FIG. 1 is a 5 HP (horsepower), 3-phase, 208 V (volt) electric motor running at 3,515 rpm (revolutions per minute). When the motor 110 is running at 3,515 rpm, it produces 7.47 foot pounds of torque. The flywheel 120 has an 18 inch radius, and weighs 288.8 lbs (pounds). When the motor 110 is running at 3,515 rpm, the flywheel 120 has a surface speed of 276.1 feet per second, and produces an energy output of centrifugal force equal to a 456.069 ton force. The flywheel 120 connects to the motor 110 via a Lovejoy coupling 112, and to the transmission 130 via the transfer shaft 122. The transmission 130 includes a gear train having a first gear with a reduction ratio of 1.3333:1, and a second gear with a reduction ratio of 1.5:1. In theory, the gear train of the transmission 130 reduces an input energy of 3,515 rpm to an output energy of 1,757.5 rpm. Due to friction and other environmental factors, the output energy observed in the prototype embodiment is 1,750 rpm. The transmission 130 connects to the generator 140 via a Lovejoy coupling 132. The generator 140 is a 33 kW (kilowatt), 1-phase generator that produces a 208 V electrical output. When the motor 110 is running at 3,515 rpm, the 456.069 ton force of the flywheel 120 drives the generator 140 with 129.122 foot pounds of torque, and 41.7 horsepower. The generator 140 connects to a charging unit 160 that charges a battery pack 162 that includes four (4) 12 volt DC (direct current) batteries.

The hybrid machine 100 shown in FIG. 1 produces enough electrical power not only to sustain its own mechanical operation, but also to power other electrical devices. The embodiment of the hybrid machine 100, as described above, produces 41.7 horsepower to drive the generator 140. When the generator 140 operates at 80% of its maximum capacity of 33 kW, the 41.7 horsepower is sufficient to produce approximately 27 kW of electrical power. Since the hybrid machine 100 only needs approximately 3 kW to sustain its own mechanical operation, the hybrid machine 100 produces approximately 24 kW of excess electrical power to power other electrical devices. Based on the 2011 average annual electricity consumption for a U.S. residential customer of 3 kW per hour, the excess electrical power that the hybrid machine 100 produces is sufficient to meet the average electricity consumption need of 8 U.S. residential customers.

In other embodiments, the hybrid machine 100, as described above, can be scaled-up to produce the horsepower needed to drive a 250 kW, 500 kW, 750 kW, or 1 MW generator. In even other embodiments, the hybrid machine 100 can be scaled-down to produce the horsepower needed to meet the electrical needs for an automobile, truck, air conditioner, or the like.

Figure 2:
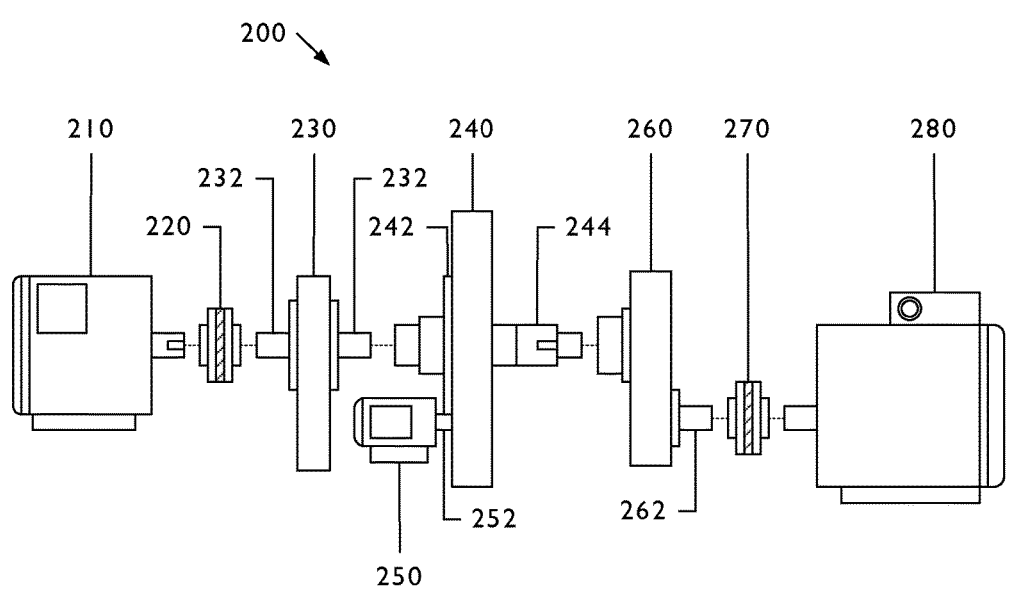
FIG. 2 is an exploded perspective diagram that illustrates one embodiment of a hybrid machine that produces sustainable energy.

FIG. 2 is an exploded perspective diagram that illustrates one embodiment of a hybrid machine that produces sustainable energy. The hybrid machine 200 shown in FIG. 2 includes a motor 210, bearing mount 230, flywheel 240, transmission gear box 260, and generator 280.

The motor 210 includes an output shaft that connects to the bearing mount 230 via a coupling 220. In one embodiment, the motor 210 includes a main control box (not shown) that includes 10-12 volt DC batteries, and two inverters, an AC to AC inverter, and a DC to AC inverter. During the initial start, the motor 210 uses the AC to AC inverter to get power from the main control box, then switches over to the DC to AC inverter to get power from the generator 280.

The coupling 220 also connects to a main drive shaft 232 that passes through the bearing mount 230 to transfer the power from the motor 210 output shaft to the bearing mount 230. The other end of the main drive shaft 232 connects the bearing mount 230 to the flywheel 240 that includes a mounted drive gear 242. A starter 250 mounted to the flywheel 240 includes a gear 252 that engages the mounted drive gear 242 during the initial start of the hybrid machine 200. In one embodiment, the starter 250 receives power from batteries (not shown) connected to the main control box (not shown) included with the motor 210.

The main drive shaft 232 drives the flywheel 240, that drives a gear input shaft 244 mounted to the other end of the flywheel 240. The gear input shaft 244 mounted to the flywheel 240 connects to the transmission gear box 260. The transmission gear box 260 includes an output shaft 262 that connects to the generator 280 via a coupling 270. In one embodiment, the generator 280 includes an AC inverter that connects to the main control box (not shown) included with the motor 210. When the rotation starts in the hybrid machine 200, in one embodiment, the generator 280 diverts approximately 20% of the power that it produces to an inverter drive that in turn will electrically drive an AC inverter duty motor.

In one embodiment, the flywheel 240 weighs 930.125 lbs. (pounds), has a diameter of 36 inches, and a rotational speed (RS) of 3,500 rpm (revolutions per minute). The kinetic energy of rotation (KEr) is calculated based on the moment of inertia (I) and angular velocity (w) as $KEr=I\times(w^2/2)$. Using the characteristics of the flywheel 240 described above, I=44.10747, w=366.52, and KEr=2,963,385.28 J (Nm). The centrifugal force (CF) is calculated based on the mass (M), angular velocity (w), and radius (r) as $CF=M\times w^2\times r$. Using the characteristics of the flywheel 240 described above, M=421,897.254, w=366.52, r=457.2, and CF=2,912.67 ton-force=61,418.8 m/s². The horsepower (HP) is calculated based on the kinetic energy of rotation (KEr) as HP=KEr/1 HP. Using the characteristics of the flywheel 240 described above, HP=2,963,385.28/735.499=4,029.0813. The torque (T) is calculated based on the horsepower (HP) and rotational speed as $T=HP\times(33,000/2\ pi)\times RS$.

The hybrid machine 200 is a self-starting, independent unit. In one embodiment, the hybrid machine 200 includes eight (8) 24 volt batteries that are charged by a converter that is charged by a 460 volt AC circuit that is transformed to a 24 volt DC circuit using a voltage regulator. The batteries connect to the control box (not shown) in the motor 210 that controls sensors and connects to the starter 250 geared to the flywheel 240 to drive the transmission gear box 260 that drives the generator 280 that supplies energy to the inverters that make the motor 210 turn. The DC circuit also assists with the initial starting of the hybrid machine 200. In one embodiment, the hybrid machine 200 is mounted in a steel, insulated enclosure complete with meters, voltage, amperage, frequency, and the like.

In other embodiments, the hybrid machine 200 uses a Sterling engine to complete the cycle system, a water cyclic geothermal system, solar ocean waves, river current, wind turbines, and the like.

Although the disclosed exemplary embodiments describe a fully functioning hybrid machine for sustainable energy, the reader should understand that other equivalent exemplary embodiments exist. Since numerous modifications and variations will occur to those reviewing this disclosure, the hybrid machine for sustainable energy is not limited to the exact construction and operation illustrated and disclosed. Accordingly, this disclosure intends all suitable modifications and equivalents to fall within the scope of the claims.

We claim:

1. An apparatus, comprising:
    a motor that includes an output shaft, wherein the motor converts an input energy into mechanical energy to rotate the output shaft;
    a flywheel that includes a shaft having a first end coupled to the output shaft of the motor, wherein design characteristics of the flywheel provide substantially uniform rotational speed to the flywheel shaft when the flywheel rotates;
    a transmission that includes an input shaft, an output shaft, and a gear train connected to the input shaft and the output shaft, wherein a second end of the shaft of the flywheel is coupled via a transfer shaft to the transmission to transfer the rotational speed of the flywheel to the transmission, and wherein the gear train transfers the rotational speed of the input shaft of the transmission to the output shaft of the transmission;
    a generator that includes an input shaft coupled to the output shaft of the transmission, wherein the generator converts the rotational speed of the output shaft of the transmission into an output energy; and
    a control unit that connects to the generator and to a charging unit, wherein the control unit monitors the output energy of the generator, and wherein the charging unit includes a circuit that transfers the output energy that the charging unit receives from the control unit and the generator,
wherein, during an initial start period, an energy source provides power to initiate rotation of the flywheel and mechanical operation of the apparatus,
wherein, after the initial start period, the circuit of the charging unit transfers a portion of the output energy to the motor to provide the input energy that sustains mechanical operation of the apparatus, and a remaining portion of the output energy to provide power to external devices.

2. The apparatus of claim 1, wherein the motor is at least one of an electric motor, a solar-powered motor, a hydro-electric motor, and a wind-powered motor.

3. The apparatus of claim 1, further comprising:
a bearing mount that includes a main drive shaft having a first end coupled to the output shaft of the motor, and a second end coupled to the shaft of the flywheel.

4. The apparatus of claim 1, the charging unit further comprising:
a battery unit, wherein the battery unit is the energy source that provides power to initiate rotation of the flywheel and mechanical operation of the apparatus by providing the input energy to the motor during the initial start period.

5. The apparatus of claim 1, further comprising:
a starter that includes a gear to engage a drive gear mounted on the flywheel during the initial start period, wherein the gear on the starter rotates to initiate rotation of the drive gear on the flywheel and mechanical operation of the apparatus.

6. The apparatus of claim 5, further comprising:
a battery unit connected to the starter, wherein the battery unit is the energy source that provides power to initiate rotation of the flywheel and mechanical operation of the apparatus by providing power to the starter during the initial start period.

7. The apparatus of claim 1, further comprising:
a starter that connects to the motor to provide the input energy to the motor during the initial start period and initiate rotation of the flywheel and mechanical operation of the apparatus.

8. The apparatus of claim 7, further comprising:
a battery unit connected to the starter, wherein the battery unit is the energy source that provides power to initiate rotation of the flywheel and mechanical operation of the apparatus by providing power to the starter during the initial start period.

* * * * *